United States Patent
Iga et al.

(10) Patent No.: US 12,281,184 B2
(45) Date of Patent: Apr. 22, 2025

(54) METHOD FOR PRODUCING HOLLOW RESIN PARTICLES

(71) Applicant: ZEON CORPORATION, Tokyo (JP)

(72) Inventors: Takashi Iga, Tokyo (JP); Nozomi Yabuki, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 776 days.

(21) Appl. No.: 17/425,987

(22) PCT Filed: Jan. 30, 2020

(86) PCT No.: PCT/JP2020/003335
§ 371 (c)(1),
(2) Date: Jul. 28, 2021

(87) PCT Pub. No.: WO2020/162300
PCT Pub. Date: Aug. 13, 2020

(65) Prior Publication Data
US 2022/0153881 A1    May 19, 2022

(30) Foreign Application Priority Data

Feb. 6, 2019   (JP) .................... 2019-019441

(51) Int. Cl.
*C08F 2/18*      (2006.01)
*C08F 212/12*    (2006.01)
(Continued)

(52) U.S. Cl.
CPC .............. *C08F 2/18* (2013.01); *C08F 212/12* (2013.01); *C08F 220/06* (2013.01); *C08F 220/1804* (2020.02); *C08F 222/102* (2020.02)

(58) Field of Classification Search
None
See application file for complete search history.

(56) References Cited

U.S. PATENT DOCUMENTS

| 2008/0318048 A1 | 12/2008 | Amrhein et al. |
| 2012/0189848 A1 | 7/2012 | Yamauchi et al. |

(Continued)

FOREIGN PATENT DOCUMENTS

| CN | 110997736 A | 4/2020 |
| CN | 111868119 A | 10/2020 |

(Continued)

OTHER PUBLICATIONS

Machine translation of JP 4448930 B2, retrieved Mar. 2024 (Year: 2024).*

(Continued)

*Primary Examiner* — Peter F Godenschwager
(74) *Attorney, Agent, or Firm* — WHDA, LLP (57) ABSTRACT

The method for producing hollow resin particles includes: carrying out a suspension treatment of a mixture liquid including a polymerizable monomer including a non-crosslinkable monomer and a crosslinkable monomer, a hydrocarbon solvent and an aqueous medium to prepare a suspension, carrying out a polymerization reaction of the suspension to form precursor particles having a hollow portion and including the hydrocarbon solvent in the hollow portion, and removing the hydrocarbon solvent included in the precursor particles to produce hollow resin particles. A content of the crosslinkable monomer is from 35 parts by mass to 95 parts by mass when the total mass of the polymerizable monomer is regarded as 100 parts by mass; a solubility parameter (SP value) of the polymerizable monomer is from 8.70 to 9.42; and a difference between the SP value of the polymerizable monomer and a SP value of the hydrocarbon solvent is 0.60 or more.

7 Claims, 2 Drawing Sheets

(51) Int. Cl.
  *C08F 220/06* (2006.01)
  *C08F 220/18* (2006.01)
  *C08F 222/10* (2006.01)

(56) References Cited

U.S. PATENT DOCUMENTS

| | | |
|---|---|---|
| 2021/0002497 A1 | 1/2021 | Iga et al. |
| 2021/0087349 A1 | 3/2021 | Iga et al. |
| 2021/0354102 A1 | 11/2021 | Hirata et al. |

FOREIGN PATENT DOCUMENTS

| | | | |
|---|---|---|---|
| JP | S62-127336 A | | 6/1987 |
| JP | 2004-123834 A | | 4/2004 |
| JP | 2004224906 A | * | 8/2004 |
| JP | 2006-257415 A | | 9/2006 |
| JP | 2006-336021 A | | 12/2006 |
| JP | 4448930 B2 | * | 4/2010 |
| JP | 2010-149024 A | | 7/2010 |
| JP | 2012-007056 A | | 1/2012 |
| JP | 6513273 B1 | | 5/2019 |
| WO | 2004/067638 A1 | | 8/2004 |
| WO | 2012/014279 A1 | | 2/2012 |
| WO | 2019/026899 A1 | | 2/2019 |
| WO | 2019/188996 A1 | | 10/2019 |
| WO | 2020/066623 A1 | | 4/2020 |

OTHER PUBLICATIONS

Machine translation of JP 2004224906 A, retrieved Mar. 2024 (Year: 2024).*
Cai, Influence of solubility parameter difference between monomer and porogen on structures of poly(acrylonitrile-styene-divinylbenzene) resins, J. Appl. Polym. Sci., 2019, 46979:1-7 (First published Aug. 2, 2018) (Year: 2018).*
Notification of Transmittal of Translation of the International Preliminary Report on Patentability (Form PCT/IB/338) issued in counterpart International Application No. PCT/JP2020/003335 mailed Aug. 19, 2021 with Forms PCT/IB/373 and PCT/ISA/237. (8 pages).
The Extended European Search Report dated Sep. 28, 2022, issued in counterpart EP Application No. 20752086.7. (8 pages).
Office Action dated May 17, 2023, issued in counterpart EP application No. 20752086.7. (5 pages).

* cited by examiner

METHOD FOR PRODUCING HOLLOW RESIN PARTICLES

TECHNICAL FIELD

The present disclosure relates to a method for producing hollow resin particles having high void ratio.

BACKGROUND ART

Hollow resin particles can scatter light well and can reduce light transmissivity as compared to resin particles having practically no voids in their interiors; hence, hollow resin particles are widely used in the applications of, for example, aqueous coating materials and paper coating compositions, as organic pigments and masking agents excellent in optical properties such as opacity and whiteness.

Meanwhile, in the applications of, for example, aqueous coating materials and paper coating compositions, an increase in the void ratio of contained hollow resin particles is desired in order to improve effects such as weight reduction, acquisition of heat insulating properties, and opacification of coating materials, paper coating compositions, etc. However, in conventionally known production methods, it has been difficult to stably produce hollow resin particles having high void ratio while satisfying production conditions that can provide desired physical properties.

Patent Literature 1 discloses a technique such that a polymerizable monomer component is dispersed in an aqueous dispersion medium in the presence of fine particles of a dissimilar polymer, which is different in composition from the polymerizable monomer component, to cause the polymerizable monomer component to be absorbed in the fine particles, and then the polymerizable monomer component is polymerized. Patent Literature 1 mentions that in the aqueous dispersion medium, the dissimilar polymer is allowed to coexist in the form of fine particles or solution with the polymerizable monomer component; thereby during polymerization, a nucleus is formed in the interior of the dispersed particles by the phase separation of the dissimilar polymer, and polymerization shrinkage of a polymer that is being generated on the nucleus occurs; and as a result, a hole is formed in the interior of the polymer.

Patent Literature 2 discloses a method for producing single-hole hollow fine polymer particles, which includes: preparing a dispersion of swollen particle droplets by mixing a seed particle dispersion obtained by dispersing uncrosslinked polymer-containing seed particles in a water-containing dispersion medium, with a radical polymerizable monomer, an oil-soluble solvent and an oil-soluble polymerization initiator, and causing the radical polymerizable monomer, the oil-soluble solvent and the oil-soluble polymerization initiator to be absorbed in the seed particles; and polymerizing the radical polymerizable monomer in the swollen particle droplets, and in which the relationship between the SP value (SPp) of a polymer obtained by polymerizing the radical polymerizable monomer and the SP value (SPs) of the oil-soluble solvent satisfies the following formula (1):

$$2.1 \leq SPp - SPs \leq 7.0 \tag{1}.$$

Patent Literature 2 mentions that, in a method for producing polymer particles by causing a radical polymerizable monomer component to be absorbed in seed particles and then inducing radical polymerization, single-hole hollow fine polymer particles having an extremely uniform outside diameter and inside diameter can easily be produced when the difference between the SP value of the polymer obtained by polymerizing the radical polymerizable monomer and the SP value of the oil-soluble solvent used as the hole-forming agent is set so as to fall in a specific range.

Patent Literature 3 discloses a method for producing a porous hollow polymer particle, which includes: suspending, in a polar solvent containing a dispersion stabilizer, a monomer solution for polymerization obtained by mixing 100 parts by weight of a monomer component for polymerization containing a polyfunctional monomer, with 1 to 400 parts by weight of an organic solvent that is non-reactive with a monomer for polymerization; polymerizing the monomer component to obtain a polymer particle including the organic solvent; and then removing the organic solvent from the obtained polymer particle, and in which the polyfunctional monomer is at least 5% by weight or more of the monomer component for polymerization when the difference between the solubility parameter (SP value) of the mixed monomer component and that of the organic solvent is less than 1.0 $MPa^{0.5}$, and the polyfunctional monomer is at least 20% by weight or more of the monomer component for polymerization when the difference is 1.0 $MPa^{0.5}$ or more and less than 1.5 $MPa^{0.5}$.

Patent Literature 3 mentions the following: this production method is characterized in that the difference between the SP value of the monomer component for polymerization and that of the organic solvent is less than 2.0 $MPa^{0.5}$, and the polyfunctional monomer is 5% by weight or more of the monomer component for polymerization; the reason why the SP value difference is less than 2.0 $MPa^{0.5}$, is because phase separation between the polymer component and the organic solvent during polymerization is suppressed by bringing the SP value of the monomer for polymerization and that of the organic solvent close to each other; and the reason why the polyfunctional monomer is 5% by weight or more, is because when the polyfunctional monomer is in a small amount, there is a problem such that the particle is in irregular shape when the SP value difference is large, and the hollow portion in the interior of the particle shrinks when the SP value difference is small.

CITATION LIST

Patent Literatures

[Patent Literature 1] JP S62-127336 A
[Patent Literature 2] International Publication No. WO 2012/014279
[Patent Literature 3] JP 2006-336021 A

SUMMARY OF INVENTION

Technical Problem

However, the polymer particles mentioned in Patent Literature 1 has a problem in that it is difficult to obtain hollow fine polymer particles having a uniform outside diameter and inside diameter.

In the method for producing the single-hole hollow fine polymer particles mentioned in Patent Literature 2, the preferred upper limit of the amount of a crosslinkable monomer used is 5% by weight because, if the crosslinkable monomer is more than 5% by weight of the total of the crosslinkable monomer and a non-crosslinkable monomer, there is a possibility that the absorption of the radical polymerizable monomer and so on into the obtained seed particles decreases and fails to form the swollen particle droplets.

In the method of Patent Literature 2, as just described, since the amount of the crosslinkable monomer used is limited to a small range, there is a problem in that the hollow polymer particles obtain poor shell strength.

The method for producing the porous hollow polymer particle mentioned in Patent Literature 3 has a problem in that it is difficult to produce a hollow polymer particle with a high void ratio since the particle is porous.

Also, there is the following problem: when a single-hole hollow resin particle having only one large non-porous void in the interior of the particle and a thin shell is formed in order to obtain a high void ratio, the particle strength is insufficient and the particle is likely to collapse.

An object of the present disclosure is to provide a method for producing hollow resin particles having a higher void ratio than ever before. Another object of the present disclosure is to provide a method for producing hollow resin particles having a high void ratio and a large particle strength.

Solution to Problem

The inventors of the present disclosure focused on that the solubility parameter (SP value) of a polymerizable monomer and the difference between the solubility parameter (SP value) of the polymerizable monomer and the solubility parameter (SP value) of a hydrocarbon solvent incorporated into monomer droplets to form a hollow portion, are important in increasing the void ratio of hollow resin particles in the method for obtaining hollow resin particles by suspension polymerization.

As the void ratio of the hollow resin particles increases, the shell strength of the hollow resin particles is likely to decrease. Accordingly, the inventors of the present disclosure focused on that the amount of a crosslinkable monomer used is important in reinforcing the shell of the hollow resin particles.

According to the present disclosure, a method for producing hollow resin particles is provided, the method comprising:
  carrying out a suspension treatment of a mixture liquid comprising a polymerizable monomer comprising at least one non-crosslinkable monomer and at least one crosslinkable monomer, a hydrocarbon solvent and an aqueous medium to prepare a suspension in which monomer droplets containing the hydrocarbon solvent are dispersed in the aqueous medium,
  carrying out a polymerization reaction of the suspension to form precursor particles having a hollow portion and including the hydrocarbon solvent in the hollow portion, and
  removing the hydrocarbon solvent included in the precursor particles to produce hollow resin particles,
  wherein a content of the crosslinkable monomer in the mixture liquid is from 35 parts by mass to 95 parts by mass when the total mass of the polymerizable monomer is regarded as 100 parts by mass;
  wherein a solubility parameter (SP value) of the polymerizable monomer is from 8.70 to 9.42; and
  wherein a difference between the solubility parameter (SP value) of the polymerizable monomer and a solubility parameter (SP value) of the hydrocarbon solvent is 0.60 or more.

In the production method of the disclosed embodiments, the void ratio of the hollow resin particles may be from 60% to 95%.

Also in the production method of the disclosed embodiments, the number average particle diameter of the hollow resin particles may be from 0.1 μm to 10 μm.

Advantageous Effects of Invention

According to the production method of the present disclosure, hollow resin particles having a higher void ratio than ever before, can be produced. In a preferred embodiment of the present disclosure, hollow resin particles having a high void ratio and a large particle strength can be produced. In another preferred embodiment of the present disclosure, hollow resin particles having a single-hole structure, a high void ratio and a large particle strength can be produced.

DESCRIPTION OF EMBODIMENTS

The hollow resin particles of the present disclosure are particles which have a resin-containing shell (outer shell) and a hollow portion surrounded by the shell.

In the present disclosure, the term "hollow portion" means a void space clearly distinguished from the shell of hollow particles formed from a resin material. The shell of the hollow resin particles may have a porous structure. In this case, the hollow portion has a size that can be clearly distinguished from many minute spaces uniformly dispersed in the porous structure.

The hollow portion of the hollow particles can be determined by, for example, SEM observation of a cross section of the particles or TEM observation of the particles as they are.

The hollow portion of the hollow particles may be filled with gas such as air, or it may contain a liquid such as a solvent.

The resin shell of the particles may have no communication hole, and the term "hollow portion" in the present disclosure may be isolated from the outside of the particles by the shell of the particles.

The resin shell of the particles may have one or two or more communication holes, and the term "hollow portion" in the present disclosure may communicate with the outside of the particles via the communication holes.

In the present disclosure, the term "precursor particles" means an intermediate obtained in the polymerization step, resin particles having the hollow portion, and particles of which the hollow portion is filled with the hydrocarbon solvent used to form the hollow portion in the polymerization step. In the present disclosure, the term "precursor composition" means a composition containing the precursor particles.

The hollow resin particle production method of the present disclosure is a method for producing hollow resin particles, the method comprising:
  carrying out a suspension treatment of a mixture liquid comprising a polymerizable monomer comprising at least one non-crosslinkable monomer and at least one crosslinkable monomer, a hydrocarbon solvent and an aqueous medium to prepare a suspension in which monomer droplets containing the hydrocarbon solvent are dispersed in the aqueous medium, carrying out a polymerization reaction of the suspension to form precursor particles having a hollow portion and including the hydrocarbon solvent in the hollow portion, and removing the hydrocarbon solvent included in the precursor particles to produce hollow resin particles, wherein a content of the crosslinkable monomer in the mixture liquid is from 35 parts by mass to 95 parts by mass when the total mass of the polymerizable monomer is regarded as 100 parts by mass;

wherein a solubility parameter (SP value) of the polymerizable monomer is from 8.70 to 9.42; and wherein a difference between the solubility parameter (SP value) of the polymerizable monomer and a solubility parameter (SP value) of the hydrocarbon solvent is 0.60 or more.

The method described above basically includes the mixture liquid preparation step, the suspension preparation step, the polymerization step and the solvent removal step. The method may further include other steps.

For example, a solid-liquid separation step may be performed after the polymerization step, and a solvent removal step may be performed in an air atmosphere for removal of the hydrocarbon solvent in the precursor particles. Also, by using a hydrophilic monomer as at least a part of the non-crosslinkable monomer, a base addition step may be performed after the polymerization step to swell the precursor particles, and then the hydrocarbon solvent in the precursor particles may be replaced with the aqueous medium.

1. Method for Producing Hollow Resin Particles

A preferred embodiment of the production method of the present disclosure includes the following steps.

(1) Mixture Liquid Preparation Step

This is a step of preparing a mixture liquid comprising a polymerizable monomer comprising at least one non-crosslinkable monomer and at least one crosslinkable monomer, a hydrocarbon solvent and an aqueous medium.

(2) Suspension Preparation Step

This is a step of carrying out a suspension treatment of the mixture liquid to prepare a suspension in which monomer droplets containing the hydrocarbon solvent are dispersed in the aqueous medium.

(3) Polymerization Step

This is a step of carrying out a polymerization reaction of the suspension to prepare a precursor composition containing precursor particles having a hollow portion and including the hydrocarbon solvent in the hollow portion.

(4) Solid-Liquid Separation Step

This is a step of carrying out a solid-liquid separation of the precursor composition to obtain the precursor particles.

(5) Solvent Removal Step

This is a step of removing the hydrocarbon solvent included in the precursor particles in a gaseous atmosphere to obtain hollow resin particles of which the hollow portion is filled with gas.

Figure 1:
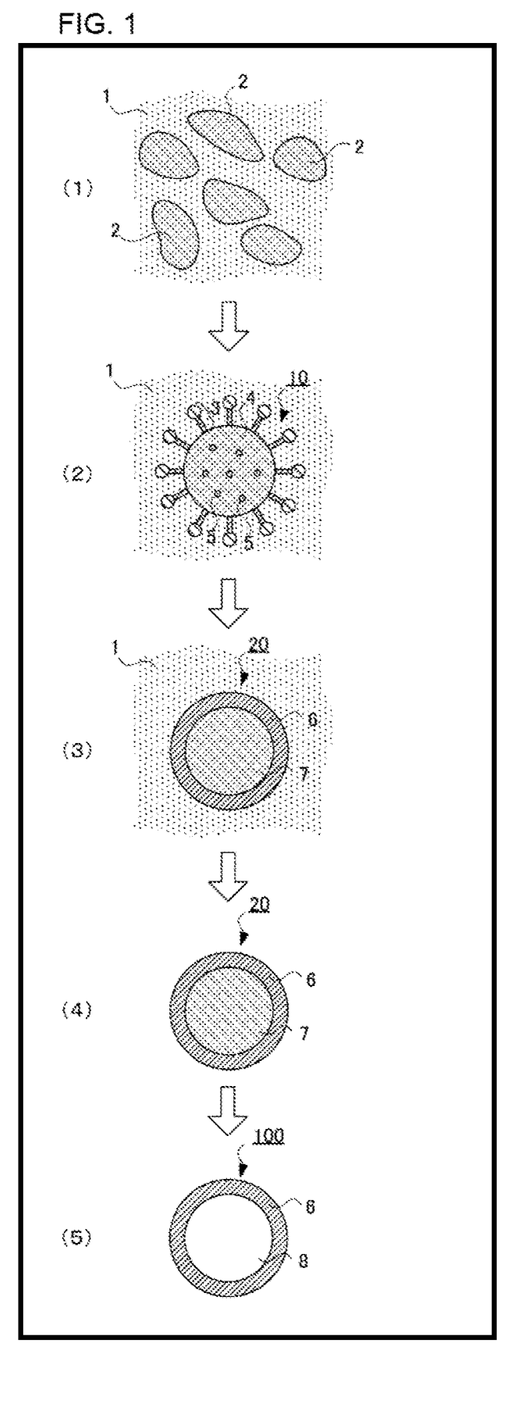
FIG. 1 is a diagram illustrating an example of the production method of the present disclosure.

FIG. 1 is a schematic diagram showing an example of the production method of the present disclosure. The diagrams (1) to (5) in FIG. 1 correspond to the steps (1) to (5) described above, respectively. White arrows between the diagrams indicate the order of the steps. FIG. 1 is merely a schematic diagram for description, and the production method of the present disclosure is not limited to the method shown in FIG. 1. Further, the structures, dimensions and shapes of materials used for the production methods of the present disclosure are not limited to the structures, dimensions and shapes of various materials shown in these diagrams.

The diagram (1) of FIG. 1 is a schematic cross-sectional view showing an embodiment of the mixture liquid in the mixture liquid preparation step. As shown in the diagram, the mixture liquid contains an aqueous medium 1 and a lipophilic material 2 dispersed in the aqueous medium 1. Here, the lipophilic material 2 means a material that has low polarity and is less likely to mix with the aqueous medium 1, such as a hydrocarbon solvent.

The diagram (2) of FIG. 1 is a schematic cross-sectional view showing an embodiment of the suspension in the suspension preparation step. The suspension contains the aqueous medium 1 and a micelle 10 (monomer droplet) dispersed in the aqueous medium 1. The micelle 10 is formed by an oil-soluble monomer composition 4 (containing an oil-soluble polymerization initiator 5, etc.) and a suspension stabilizer 3 (such as a surfactant) surrounding the periphery of the oil-soluble monomer composition 4.

The diagram (3) of FIG. 1 is a schematic cross-sectional view showing an embodiment of the precursor composition after the polymerization step. The precursor composition contains the aqueous medium 1 and a precursor particle 20 dispersed in the aqueous medium 1. A shell 6 forming the outer surface of the precursor particle 20 is formed by polymerization of a monomer, etc., in the micelle 10. The hollow portion in the interior of the shell 6 includes a hydrocarbon solvent 7.

The diagram (4) of FIG. 1 is a schematic cross-sectional view showing an embodiment of the precursor particle after the solid-liquid separation step. The diagram (4) of FIG. 1 shows a state where the aqueous medium 1 is separated from the state shown in the diagram (3) of FIG. 1.

The diagram (5) of FIG. 1 is a schematic cross-sectional view showing an embodiment of the hollow resin particle after the solvent removal step. The diagram (5) of FIG. 1 shows a state where the hydrocarbon solvent 7 is removed from the state shown in the diagram (4) of FIG. 1. As a result, a hollow resin particle 100 having a hollow portion 8 in the interior of the shell 6 is obtained.

Hereinbelow, the five steps mentioned above and other steps are described in order.

(1) Mixture Liquid Preparation Step

The present step is a step of preparing a mixture liquid comprising a polymerizable monomer comprising at least one non-crosslinkable monomer and at least one crosslinkable monomer, a hydrocarbon solvent and an aqueous medium.

In the present disclosure, as the polymerizable monomer, at least one non-crosslinkable monomer and at least one crosslinkable monomer are used in combination. The polymerizable monomer is a compound having a polymerizable functional group. The non-crosslinkable monomer is a polymerizable monomer having only one polymerizable functional group. The crosslinkable monomer is a polymerizable monomer having two or more polymerizable functional groups and being able to form crosslinking in resin by polymerization reaction. As the polymerizable monomer, a compound having an ethylenically unsaturated bond as a polymerizable functional group, is generally used.

The mixture liquid may further contain other materials such as an oil-soluble polymerization initiator and a suspension stabilizer. The materials for the mixture liquid will be described in the order of (A) the polymerizable monomer, (B) the oil-soluble polymerization initiator, (C) the hydrocarbon solvent, (D) the suspension stabilizer and (E) the aqueous medium.

(A) Polymerizable Monomer

[Non-Crosslinkable Monomer]

As the non-crosslinkable monomer, a monovinyl monomer is preferably used. The monovinyl monomer is a compound having one polymerizable vinyl functional group. As the monovinyl monomer, examples include, but are not limited to, at least one (meth)acrylic monovinyl monomer selected from the group consisting of acrylate and methacrylate; an aromatic vinyl monomer such as styrene, vinyltoluene, α-methylstyrene, p-methylstyrene and halogenated styrene; a monoolefin monomer such as ethylene, propylene and butylene; a (meth)acrylamide monomer such as (meth)acrylamide, N-methylol (meth)acrylamide and N-butoxymethyl (meth)acrylamide, and derivatives thereof; a diene monomer such as butadiene and isoprene; a carboxylic acid vinyl ester monomer such as vinyl acetate; a vinyl halide monomer such as vinyl chloride; a vinylidene halide monomer such as vinylidene chloride; and a vinylpyridine monomer. The monovinyl monomer may be at least one (meth) acrylic monovinyl monomer selected from the group consisting of acrylate and methacrylate.

As the (meth)acrylic monovinyl monomer, examples include, but are not limited to, methyl (meth)acrylate, ethyl (meth)acrylate, butyl (meth)acrylate, 2-ethylhexyl (meth)acrylate, lauryl (meth)acrylate and glycidyl (meth)acrylate. In the present disclosure, (meth)acryl means each of acryl and methacryl, and (meth)acrylate means each of acrylate and methacrylate.

Among the (meth)acrylic monovinyl monomers described above, preferably, at least one selected from the group consisting of butyl acrylate and methyl methacrylate is used.

As the non-crosslinkable monomer, a hydrophilic monomer may be used. As the hydrophilic monomer, a monovinyl monomer soluble in water is preferably used. For the hydrophilic monomer, the solubility in water at 20° C. is preferably 1% by mass or more.

As the hydrophilic monomer, examples include, but are not limited to, a monomer having a hydrophilic group, such as an acid group-containing monomer, a hydroxy group-containing monomer, an amide group-containing monomer and a polyoxyethylene group-containing monomer.

The acid group-containing monomer means a monomer containing an acid group. The acid group encompasses both a proton-donating group (a Brønsted acid group) and an electron-pair accepting group (a Lewis acid group). The acid group-containing monomer is preferably used as the hydrophilic monomer, from the point of view that the hollow resin particles thus obtained are hollow resin particles with high heat resistance.

The acid group-containing monomer is not particularly limited, as long as it has an acid group. As the acid group-containing monomer, examples include, but are not limited to, an ethylenically unsaturated carboxylic acid monomer such as acrylic acid, methacrylic acid, crotonic acid, cinnamic acid, itaconic acid, fumaric acid, maleic acid, butene tricarboxylic acid, a carboxyl group-containing monomer such as a monoalkyl ester of an unsaturated dicarboxylic acid such as monoethyl itaconate, monobutyl fumarate and monobutyl maleate, and a sulfonic acid group-containing monomer such as styrene sulfonate. Among acid group-containing monomers, an ethylenically unsaturated carboxylic acid monomer is preferably used; at least one acrylic hydrophilic monomer selected from the group consisting of acrylic acid and methacrylic acid and a maleic acid monomer are more preferably used; and an acrylic hydrophilic monomer is still more preferably used. In the case where an acrylic hydrophilic monomer ((meth)acrylic acid) and a (meth)acrylic monovinyl monomer ((meth)acrylate) are used in combination, a preferred mass ratio is (meth) acrylic acid:(meth)acrylate=100:0 to 30:70, and a more preferred mass ratio is (meth)acrylic acid:(meth)acrylate=95:5 to 35:65. Thus, by using monomers resistant to relatively high temperature conditions in combination, such as (meth)acrylic acid and a (meth)acrylate described above, the heat resistance of the obtained hollow resin particles can be increased compared to the case of using a monomer having a nitrile group, for example.

As the hydroxy group-containing monomer, examples include, but are not limited to, 2-hydroxyethyl (meth)acrylate, 2-hydroxypropyl (meth)acrylate and 4-hydroxybutyl (meth)acrylate monomer.

Examples of the amide group-containing monomer include a (meth)acrylamide monomer such as (meth)acrylamide and dimethyl (meth)acrylamide.

Examples of the polyoxyethylene group-containing monomer include a methoxypolyethylene glycol (meth) acrylate monomer.

However, it is preferable not to use both acrylonitrile and methacrylonitrile as the hydrophilic monomer. The reason is as follows. A nitrile group is heat-sensitive. Accordingly, the monomers containing a nitrile group have poor heat resistance, and the particles thus obtained may have a low void ratio.

The non-crosslinkable monomers mentioned above may be used alone or in combination of two or more.

When the total mass of the non-crosslinkable monomer is regarded as 100 parts by mass, the content of the hydrophilic monomer in the non-crosslinkable monomer is preferably from 10 parts by mass to 50 parts by mass, and more preferably from 15 parts by mass to 40 parts by mass. Since the content of the hydrophilic monomer is from 10 parts by mass to 50 parts by mass, in the base addition step described later, a base is likely to penetrate into the particles; the hollow portion can be easily and quickly formed in the interior of the particles; and a copolymerization reaction between the monovinyl monomer and the hydrophilic monomer can stably proceed.

[Crosslinkable Monomer]

In the present disclosure, the mechanical characteristics of the shell of the obtained hollow resin particles can be enhanced by using the crosslinkable monomer in combination with the non-crosslinkable monomer. Further, since the crosslinkable monomer has a plurality of polymerizable functional groups, polymer chains can be linked together. Especially, dissolving out of the hydrophilic monomer (especially the acid group-containing monomer) to the outside of the hollow resin particles can be suppressed, and the heat resistance of the obtained hollow resin particles can be enhanced.

Examples of the crosslinkable monomer include divinylbenzene, diallyl phthalate, allyl (meth)acrylate and ethylene glycol di(meth)acrylate. Among them, divinylbenzene and ethylene glycol di(meth)acrylate are preferred.

When the total mass of the components (except for the aqueous medium) in the mixture liquid is regarded as 100 parts by mass, the content of the polymerizable monomer (all of the non-crosslinkable monomer and the crosslinkable monomer) in the mixture liquid is preferably 6 parts by mass or more, and more preferably 12 parts by mass or more. Since the content of the polymerizable monomer is 6 parts by mass or more, the mechanical characteristics of the hollow resin particles can be enhanced than ever before, to the extent of maintaining the hollow structure of the hollow resin particles thus obtained.

In the present disclosure, when the total mass of the non-crosslinkable monomer and the crosslinkable monomer is regarded as 100 parts by mass, the content of the crosslinkable monomer is from 35 parts by mass to 95 parts by mass, preferably from 38 parts by mass to 93 parts by mass, more preferably from 40 parts by mass to 90 parts by mass, still more preferably from 50 parts by mass to 90 parts by mass, and particularly preferably from 70 parts by mass to 90 parts by mass. When the content of the crosslinkable monomer is from 35 parts by mass to 95 parts by mass, the hollow resin particles thus obtained can maintain sufficient particle strength, be resistant to bents and obtain better heat resistance, even if the void ratio of the particles is increased.

In the present disclosure, the solubility parameter (SP value) of the polymerizable monomer is from 8.70 to 9.42, preferably from 8.71 to 9.41, and more preferably from 8.72 to 9.40. When the SP value of the polymerizable monomer is less than 8.70 and when the SP value of the polymerizable monomer is more than 9.42, the polymerization stability of the suspension deteriorates, and the resin particles thus obtained may aggregate.

Also in the present disclosure, the difference between the solubility parameter (SP value) of the polymerizable monomer and the solubility parameter (SP value) of the hydrocarbon solvent is 0.60 or more, preferably 0.65 or more, more preferably 0.70 or more, still more preferably 1.00 or more, and particularly preferably 1.25 or more. When the difference between the SP value of the polymerizable monomer and the SP value of the hydrocarbon solvent is less than 0.60, phase separation between a polymer thus generated and the hydrocarbon solvent is less likely to occur, and not only single-hole hollow resin particles but also solid fine particles and porous hollow resin particles may be formed.

Also in the present disclosure, the difference between the solubility parameter (SP value) of the polymerizable monomer and the solubility parameter (SP value) of the hydrocarbon solvent is preferably 3.00 or less, more preferably 2.75 or less, still more preferably 2.50 or less, and particularly preferably 2.30 or less. When the difference between the SP value of the polymerizable monomer and the SP value of the hydrocarbon solvent is 3.00 or less, the polymerization stability of the suspension increases, and the aggregation of the resin particles thus obtained can be easily suppressed.

In the present disclosure, the difference between "the solubility parameter (SP value) of the polymerizable monomer" (SP1) and "the solubility parameter (SP value) of the hydrocarbon solvent" (SP2) is obtained by the following formula: "the solubility parameter (SP value) of the polymerizable monomer" (SP1)—"the solubility parameter (SP value) of the hydrocarbon solvent" (SP2). For example, the case where the difference is −0.70 does not correspond to the case where the difference between the solubility parameter (SP value) of the polymerizable monomer and the solubility parameter (SP value) of the hydrocarbon solvent is 0.60 or more.

By setting the solubility parameter (SP value) of the polymerizable monomer within the above range and by setting the difference between the solubility parameter (SP value) of the polymerizable monomer and the solubility parameter (SP value) of the hydrocarbon solvent within the above range, the hydrocarbon solvent is likely to collect in the interior of the monomer droplets. Accordingly, a hollow portion having a large single-hole structure can be formed in the interior of the resin particles. As a result, hollow resin particles having a single-hole structure and a high void ratio can be formed.

In the present disclosure, the SP value means a solubility parameter δ calculated by the following formula (1), using the ΔF and Δv values of various kinds of atomic groups mentioned in the following Table 1 reported by Okitsu (Toshinao Okitsu, "Setchaku", Kobunshi Kankokai, Vol. 40, No. 8 (1996), pp. 342-350). In the case of a mixed solvent and a copolymer, the SP value means a solubility parameter δmix calculated by the following formula (2).

$$\delta = \Sigma \Delta F / \Sigma \Delta v \quad \text{Formula (1)}$$

$$\delta_{mix} = \varphi_1 \delta_1 + \varphi_2 \delta_2 + \ldots + \varphi_n \delta_n \quad \text{Formula (2)}$$

(In the formulae, ΔF denotes ΔF in the following Table 1; Δv denotes molar volume Δv in the following Table 1; and φ denotes volume fraction or mole fraction, and $\varphi_1 + \varphi_2 + \ldots \varphi_n = 1$.)

TABLE 1

| Groups | Okitsu's ΔF | Okitsu's Δv | Groups | Okitsu's ΔF | Okitsu's Δv | Groups | Okitsu's ΔF | Okitsu's Δv |
|---|---|---|---|---|---|---|---|---|
| —CH$_3$ | 205 | 31.8 | —OH(Diol) | 270 | 12.0 | —SH | 310 | 28.0 |
| —CH$_2$— | 132 | 16.5 | —OH(Arom) | 238 | 12.0 | >SO$_2$ | 675 | 11.4 |
| >CH— | 28.6 | −1.0 | —NH$_2$ | 273 | 16.5 | >S=O | 485 | 11.4 |
| >CH—(Poly) | 28.6 | 1.9 | —NH$_2$(Arom) | 238 | 21.0 | —S— | 201 | 12.0 |
| >C< | −81 | 14.8 | —NH— | 180 | 8.5 | S= | 201 | 23.0 |
| >C<(Poly) | −81 | 19.2 | —NH—(Link) | 180 | 4.0 | SO$_3$ | 322 | 27.5 |
| CH$_2$= | 195 | 31.0 | —N< | 61.0 | −9.0 | SO$_4$ | 465 | 31.8 |
| —CH= | 116 | 13.7 | —N= | 118 | 5.0 | >Si< | 16.3 | 0 |
| >C= | 24.2 | −2.4 | —N=(Link) | 118 | 15.0 | PO$_4$ | 374 | 28.0 |
| =C= | 200 | 25.0 | CN | 420 | 23.0 | Π | 81 | 8.0 |
| —C≡ | 100 | 6.5 | —CN(Arom) | 252 | 27.0 | —C$_6$H$_5$(Arom) | 731 | 72.0 |
| —O— | 120 | 5.1 | —CN(Poly) | 420 | 27.0 | —C$_6$H$_4$(Arom) | 655 | 62.0 |
| —O—(Arom, Lin) | 70 | 3.8 | —NO$_2$ | 481 | 24.0 | —C$_6$H$_3$(Arom) | 550 | 39.0 |
| —O—(Epoxy) | 176 | 5.1 | —NO$_2$(Arom) | 342 | 32.0 | —C$_6$H$_2$(Arom) | 450 | 27.0 |
| —CO— | 286 | 10.0 | —NCO | 498 | 35.0 | —C$_6$H$_5$(Poly) | 731 | 79.0 |
| —COOH | 373 | 24.4 | —NHCO— | 690 | 18.5 | —C$_6$H$_4$(Poly) | 655 | 69.0 |
| —COOH(Arom) | 242 | 24.4 | >NHCO— | 441 | 5.4 | —C$_6$H$_3$(Poly) | 550 | 47.0 |
| —COO— | 353 | 19.6 | —CL(Mono) | 330 | 23.0 | —C$_6$H$_2$(Poly) | 450 | 32.0 |
| —COO—(Poly) | 330 | 22.0 | —CL(Di) | 250 | 25.0 | —(Cyclohexyl) | 790 | 97.5 |
| —O—CO—O— | 526 | 20.0 | —CL(Tri, Tetra) | 235 | 27.0 | (Plus onto upper groups) | | |
| —CHO | 370 | 25.0 | —CL(Arom) | 235 | 27.0 | 3 Member 1 in | +110 | +18 |

TABLE 1-continued

| Groups | Okitsu's ΔF | Δv | Groups | Okitsu's ΔF | Δv | Groups | Okitsu's ΔF | Δv |
|---|---|---|---|---|---|---|---|---|
| —CHO(Arom) | 213 | 29.0 | —CL(>C<) | 235 | 28.0 | 4 Member 1 in | +110 | +18 |
| —OH(Mono) | 395 | 10.0 | —CL(Poly) | 270 | 27.0 | 5 Member 1 in | +110 | +16 |
| —OH(Ether) | 342 | 12.0 | —Br(mean) | 302 | 30.0 | 6 Member 1 in | +100 | +16 |
| —OH(H$_2$O) | 342 | 12.0 | —F(mean) | 130 | 19.0 | Conjugated | +30 | −22 |
| —OH(Poly) | 282 | 17.0 | —F(Poly) | 110 | 21.0 | Double bond Ditto(Link) | +30 | −10 |

Note:
(Poly) = Polymer;
(Arom) = Aromatic;
(Lin) = Link

For example, the SP value of cyclohexane used as the solvent, is obtained as follows.

Cyclohexane has six —CH$_2$— as an atomic group. The ΔF and Δv values of the atomic group is obtained from Table 1.

$$\Delta\Sigma F = 132 \times 6 = 792$$

$$\Sigma\Delta v = 16.5 \times 6 = 99$$

Accordingly, by the formula (1), δhex of cyclohexane is obtained as follows.

$$\delta hex = \Sigma\Delta F/\Sigma\Delta v = 792/99 = 8.00$$

For example, the SP value of a copolymer of 40 parts of methacrylic acid and 60 parts of ethylene glycol dimethacrylate is obtained as follows. The SP value of methacrylic acid alone is 9.40, and the SP value of ethylene glycol dimethacrylate alone is 9.42. The molecular weight of methacrylic acid is 86, and the molecular weight of ethylene glycol dimethacrylate is 198. Accordingly, the mole fraction of the copolymer is as follows: methacrylic acid:ethylene glycol dimethacrylate=(40/86):(60/198)=0.46:0.30. By the above formula, the SP value of the copolymer is obtained as follows.

$$\delta mix = 0.46/(0.46+0.30) \times 9.40 + 0.30/(0.46+0.30) \times 9.42 = 9.41$$

(B) Oil-Soluble Polymerization Initiator

In the present disclosure, the mixture liquid preferably contains an oil-soluble polymerization initiator. As the method for polymerizing the monomer droplets after suspending the mixture liquid, examples include an emulsion polymerization method using a water-soluble polymerization initiator and a suspension polymerization method using an oil-soluble polymerization initiator. By using the oil-soluble polymerization initiator, suspension polymerization can be performed.

The oil-soluble polymerization initiator is not particularly limited, as long as it is a lipophilic one having a solubility in water at 20° C. of 0.2% by mass or less. Examples of the oil-soluble polymerization initiator include benzoyl peroxide, lauroyl peroxide, t-butyl peroxide 2-ethylhexanoate, 2,2'-azobis(2,4-dimethylvaleronitrile) and azobis(isobutyronitrile).

When the total mass of the polymerizable monomer in the mixture liquid is regarded as 100 parts by mass, the content of the oil-soluble polymerization initiator is preferably from 0.1 parts by mass to 10 parts by mass, more preferably from 0.5 parts by mass to 7 parts by mass, and still more preferably from 1 part by mass to 5 parts by mass. Since the content of the oil-soluble polymerization initiator is from 0.1 parts by mass to 10 parts by mass, the polymerization reaction can progress sufficiently; the oil-soluble polymerization initiator is less likely to be left after the end of polymerization reaction; and an unexpected side reaction is less likely to progress.

(C) Hydrocarbon Solvent

The hydrocarbon solvent is a non-polymerizable hydrocarbon organic solvent, and it has the function of forming the hollow portion in the interior of the particles. In the suspension preparation step described later, the suspension in which the monomer droplets containing the hydrocarbon solvent are dispersed in the aqueous medium is obtained. In the suspension preparation step, phase separation occurs in the monomer droplets. As a result, the hydrocarbon solvent with low polarity is likely to collect in the interior of the monomer droplets. In the end, according to their respective polarities, the hydrocarbon solvent is distributed in the interior of the monomer droplets, and materials other than the hydrocarbon solvent are distributed at the periphery of the monomer droplets.

Then, in the polymerization step described later, the precursor composition containing the precursor particles including the hydrocarbon solvent is obtained. That is, since the hydrocarbon solvent collects in the interior of the particles, the hollow portion filled with the hydrocarbon solvent is formed in the interior of the obtained precursor particles.

The type of the hydrocarbon solvent is not particularly limited, as long as it falls within the range of the difference between the solubility parameter (SP value) of the polymerizable monomer and the solubility parameter (SP value) of the hydrocarbon solvent. Examples of the hydrocarbon solvent include at least one selected from the group consisting of an aliphatic hydrocarbon solvent, an aromatic hydrocarbon solvent and a hydrocarbon ester solvent. Examples of the aliphatic hydrocarbon solvent include butane, pentane, n-hexane, cyclohexane, heptane and octane. Examples of the aromatic hydrocarbon solvent include benzene, toluene and xylene. From the viewpoint of polarity, examples of the hydrocarbon ester solvent include a solvent having a SP value of 8.82 or less, such as n-butyl acetate, isobutyl acetate and isopropyl acetate.

The relative permittivity at 20° C. of the hydrocarbon solvent used in the present disclosure is preferably 3 or less. The relative permittivity is an index of the level of the polarity of a compound. In the case where the relative permittivity of the hydrocarbon solvent is 3 or less and sufficiently small, it is presumed that phase separation progresses rapidly in the monomer droplets and a hollow is easily formed.

Examples of solvents having a relative permittivity at 20° C. of 3 or less are as follows. The inside of the parentheses is the value of relative permittivity.

Heptane (1.9), cyclohexane (2.0), benzene (2.3), and toluene (2.4).

For the relative permittivity at 20° C., values written in known literatures (for example, the Chemical Society of Japan, as editor, "Kagaku Binran, Kiso Hen, Kaitei 4 Ban", pp. II-498 to II-503, published by Maruzen Publishing Co., Ltd. on Sep. 30, 1993) and other technical information may be used as reference. Examples of the method of measuring the relative permittivity at 20° C. include a relative permittivity test that is in conformity with 23 of JIS C 2101:1999 and is performed with the measuring temperature set to 20° C.

The hydrocarbon solvent used in the present disclosure may be a hydrocarbon compound having 5 to 7 carbon atoms. The hydrocarbon compound having 5 to 7 carbon atoms can be easily included into the precursor particles during the polymerization step, and it can be easily removed from the interior of the precursor particles during the solvent removal step. The hydrocarbon solvent is preferably a hydrocarbon compound having 6 carbon atoms. At least one of cyclohexane and n-hexane is preferably used.

When the total mass of the polymerizable monomer in the mixture liquid is regarded as 100 parts by mass, the content of the hydrocarbon solvent is preferably from 100 parts by mass to 900 parts by mass, more preferably from 150 parts by mass to 700 parts by mass, and still more preferably from 200 parts by mass to 500 parts by mass. Since the content of the hydrocarbon solvent is from 100 parts by mass to 900 parts by mass, the void ratio of the obtained hollow resin particles can be higher than ever before, and the mechanical characteristics of the hollow resin particles can be enhanced to such a degree that the hollow can be maintained.

(D) Suspension Stabilizer

The suspension stabilizer is an agent that stabilizes the suspension state of the suspension in the suspension polymerization method described later. The suspension stabilizer may contain a surfactant. The surfactant is a material for forming the micelle containing the lipophilic component such as the non-crosslinkable monomer, the crosslinkable monomer, the oil-soluble polymerization initiator and the hydrocarbon solvent, in the suspension polymerization method described later.

As the surfactant, any of a cationic surfactant, an anionic surfactant and a nonionic surfactant may be used, and they may be used in combination. Among them, an anionic surfactant and a nonionic surfactant are preferable, and an anionic surfactant is more preferable.

Examples of the anionic surfactant include sodium dodecylbenzen sulfonate, sodium lauryl sulfate, dialkyl sodium sulfosuccinate and a salt of a naphthalenesulfonic acid formalin condensation product.

Examples of the nonionic surfactant include polyoxyethylene alkyl ether, polyoxyethylene alkyl ester and polyoxyethylene sorbitan alkyl ester.

Examples of the cationic surfactant include didecyl dimethyl ammonium chloride and stearyl trimethyl ammonium chloride.

The suspension stabilizer may contain a hardly water-soluble inorganic compound, a water-soluble polymer, etc.

When the total mass of the polymerizable monomer in the mixture liquid is regarded as 100 parts by mass, the content of the suspension stabilizer is generally from 0.1 parts by mass to 6 parts by mass, preferably from 0.1 parts by mass to 5 parts by mass, more preferably from 0.1 parts by mass to 4 parts by mass, still more preferably from 0.5 parts by mass to 4 parts by mass, yet more preferably from 1 part by mass to 4 parts by mass, and most preferably from 2 parts by mass to 4 parts by mass. When the content of the suspension stabilizer is 0.1 parts by mass or more, micelles are easily formed in the aqueous medium. On the other hand, when the content of the suspension stabilizer is 6 parts by mass or less, a reduction in productivity by foaming is not likely to occur in the step of removing the hydrocarbon solvent.

(E) Aqueous Medium

In the present disclosure, the term "aqueous medium" means a medium selected from the group consisting of water, a hydrophilic solvent and a mixture of water and a hydrophilic solvent.

The hydrophilic solvent in the present disclosure is not particularly limited, as long as it is one that mixes with water sufficiently and does not develop phase separation. Examples of the hydrophilic solvent include alcohols such as methanol and ethanol; tetrahydrofuran (THF); and dimethyl sulfoxide (DMSO).

Among the aqueous media, water is preferably used in terms of its high polarity. When a mixture of water and a hydrophilic solvent is used, from the viewpoint of forming the monomer droplets, it is important that the polarity of the entire mixture is not too low. In this case, for example, the mixing ratio (mass ratio) between water and the hydrophilic solvent may be set to water:hydrophilic solvent=99:1 to 50:50.

The mixture liquid is obtained by simply mixing the above-mentioned materials and other materials as needed, appropriately stirring the mixture, etc. In the mixture liquid, an oil phase containing the lipophilic materials such as (A) the polymerizable monomer, (B) the oil-soluble polymerization initiator and (C) the hydrocarbon solvent is dispersed with a size of a particle diameter of approximately several millimeters in an aqueous phase containing (D) the suspension stabilizer, (E) the aqueous medium, etc. The dispersion state of these materials in the mixture liquid can be observed with the naked eye, depending on the types of the materials.

The mixture liquid preparation step may be the following step: the oil phase containing the lipophilic materials such as (A) the polymerizable monomer, (B) the oil-soluble polymerization initiator and (C) the hydrocarbon solvent and the aqueous phase containing hydrophilic materials such as (D) the suspension stabilizer and (E) the aqueous medium are separately prepared in advance, and then they are mixed together. As just described, by separately preparing the oil phase and the aqueous phase in advance and then mixing them, hollow resin particles such that the composition of the shell portion is uniform, can be produced.

(2) Suspension Preparation Step

The present step is a step of carrying out a suspension treatment of the mixture liquid to prepare a suspension in which the monomer droplets containing the hydrocarbon solvent are dispersed in the aqueous medium.

The suspension method for forming the monomer droplets is not particularly limited. For example, it is performed using an apparatus capable of performing strong stirring, such as an in-line type emulsifying disperser (manufactured by Pacific Machinery & Engineering Co., Ltd.; product name: MILDER) or a high-speed emulsifying disperser (manufactured by PRIMIX Corporation; product name: T.K. HOMOMIXER MARK II Type).

In the suspension prepared in the present step, the monomer droplets containing the lipophilic materials mentioned above and having a particle diameter of approximately from 0.1 μm to 10 μm are dispersed uniformly in the aqueous medium. Such monomer droplets are difficult to be observed with the naked eye and can be observed with known observation equipment such as an optical microscope.

In the present step, since phase separation occurs in the monomer droplets, the hydrocarbon solvent with low polarity is likely to collect in the interior of the monomer droplets. As a result, in the obtained monomer droplets, the hydrocarbon solvent is distributed in the interior, and the materials other than the hydrocarbon solvent are distributed at the periphery thereof.

As described above, not the emulsion polymerization method but the suspension polymerization method is employed in the present disclosure. Hereinbelow, an advantage of using the suspension polymerization method and the oil-soluble polymerization initiator is described with contrast the emulsion polymerization method.

Figure 3:
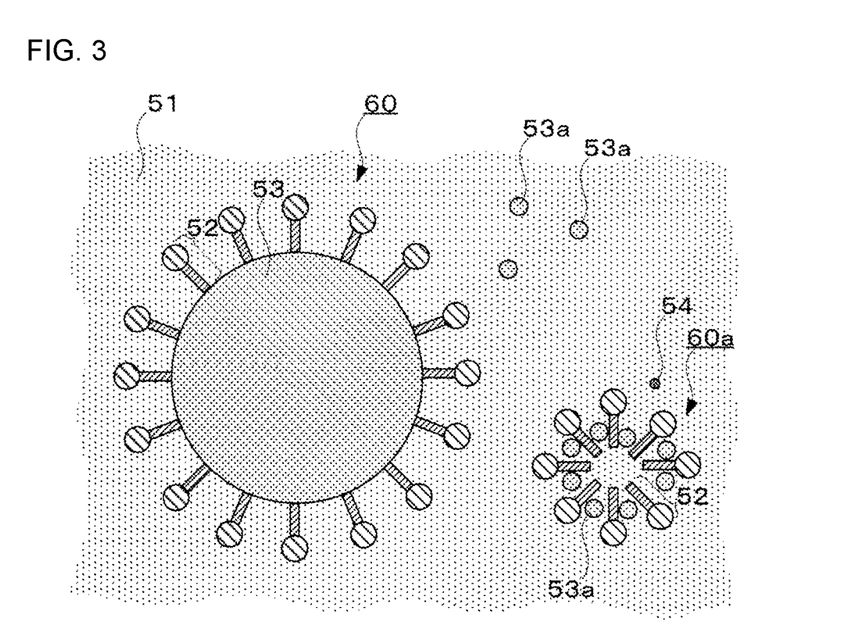
FIG. 3 is a schematic diagram showing a dispersion for conventional emulsion polymerization.

FIG. 3 is a schematic diagram showing a dispersion for emulsion polymerization. A micelle 60 in FIG. 3 schematically shows a cross section thereof.

FIG. 3 shows a situation where the micelle 60, a micelle precursor 60a, a monomer 53a dissolved out in a solvent, and a water-soluble polymerization initiator 54 are dispersed in an aqueous medium 51. The micelle 60 is formed by an oil-soluble monomer composition 53 and a surfactant 52 surrounding the periphery of the oil-soluble monomer composition 53. The monomer composition 53 contains a monomer serving as a raw material for a polymer, etc. However, it but does not contain a polymerization initiator.

The micelle precursor 60a is an aggregate of pieces of the surfactant 52; however, it does not contain a sufficient amount of the monomer composition 53 in the interior. The micelle precursor 60a incorporates the monomer 53a dissolved out in the solvent into the interior of the micelle precursor, and procures a part of the monomer composition 53 from other micelles 60. Thereby, it grows into the micelle 60.

The water-soluble polymerization initiator 54 enters the interiors of the micelle 60 and the micelle precursor 60a while being diffused in the aqueous medium 51, and promotes the growth of oil droplets in the interiors thereof. Therefore, in the emulsion polymerization method, although the micelles 60 are monodispersed in the aqueous medium 51, it is predicted that the particle diameter of the micelles 60 will grow up to several hundred nanometers (nm).

Figure 2:
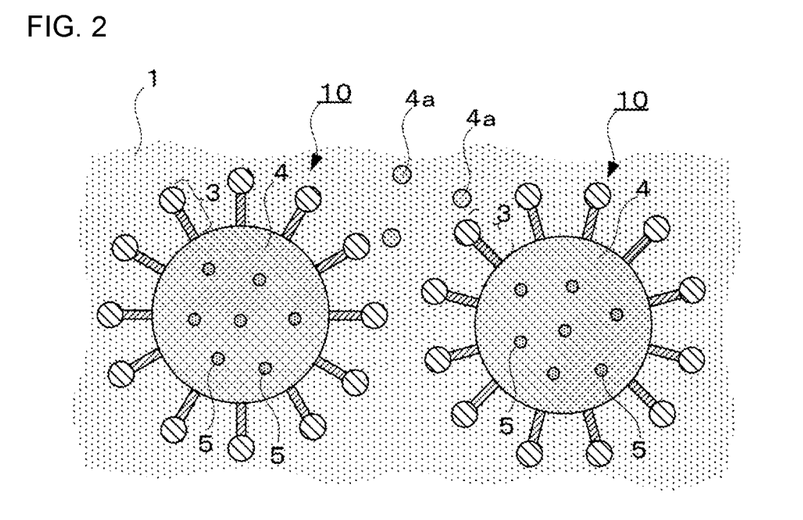
FIG. 2 is a schematic diagram showing an embodiment of a suspension in a suspension preparation step.

FIG. 2 is a schematic diagram showing an embodiment of the suspension in the present step. Each micelle 10 in FIG. 2 schematically shows a cross section thereof. FIG. 2 is merely a schematic diagram, and the suspension in the present disclosure is not limited to that shown in FIG. 2. A part of FIG. 2 corresponds to the diagram (2) of FIG. 1 described above.

FIG. 2 shows a situation where the micelles 10 and a polymerizable monomer 4a (including the non-crosslinkable monomer and the crosslinkable monomer) dispersed in the aqueous medium 1, are dispersed in the aqueous medium 1. Each micelle 10 is formed by the oil-soluble monomer composition 4 and a surfactant 3 surrounding the periphery of the oil-soluble monomer composition 4. The monomer composition 4 contains the oil-soluble polymerization initiator 5, the polymerizable monomer (including the non-crosslinkable monomer and the crosslinkable monomer) and the hydrocarbon solvent (none of them is illustrated).

As shown in FIG. 2, in the present step, a minute oil droplet that is each micelle 10 which contains the monomer composition 4 in the interior is formed in advance, and then polymerization initiating radicals are generated in the minute oil droplet by the oil-soluble polymerization initiator 5.

Therefore, the precursor particles with a target particle diameter can be produced without excessively growing the minute oil droplet.

Further, as can be seen by comparing the suspension polymerization (FIG. 2) and the emulsion polymerization (FIG. 3), the suspension polymerization (FIG. 2) does not provide an opportunity for the oil-soluble polymerization initiator 5 to come into contact with the polymerizable monomer 4a dispersed in the aqueous medium 1. Thus, the generation of surplus polymer particles in addition to the target resin particles having the hollow portion, can be prevented by using the oil-soluble polymerization initiator.

(3) Polymerization Step

The present step is a step of carrying out a polymerization reaction of the suspension to prepare the precursor composition containing the precursor particles having the hollow portion and including the hydrocarbon solvent in the hollow portion. Here, the term "precursor particle" is a particle formed mainly by copolymerization of the non-crosslinkable monomer and crosslinkable monomer described above.

The polymerization system is not particularly limited. For example, a batch system, a semicontinuous system or a continuous system may be employed. The polymerization temperature is preferably from 40° C. to 80° C., and more preferably from 50° C. to 70° C. The polymerization reaction time is preferably from 1 hour to 20 hours, more preferably from 2 hours to 15 hours, and particularly preferably from 2.5 hours to 8 hours.

Since the monomer droplets including the hydrocarbon solvent in the interior are used, the hollow containing the hydrocarbon solvent is formed in the interior of the precursor particles.

(4) Solid-Liquid Separation Step

The present step is a step of carrying out a solid-liquid separation of the precursor composition to obtain the precursor particles.

Also, the hydrocarbon solvent in the precursor particles can be removed by the following method: in a slurry containing an aqueous medium, the hydrocarbon solvent included in the precursor particles is replaced with the aqueous medium of the slurry, and then the slurry is dried to remove the aqueous medium, thereby removing the hydrocarbon solvent in the precursor particles. In this case, to obtain the hollow resin particles of which the hollow portion is filled with gas, it is needed to remove water from the precursor particles including the water.

On the other hand, in the production method of this embodiment, the slurry is subjected to solid-liquid separation after the polymerization step, and then the solid components thus obtained are dried in a gaseous atmosphere. In this case, the same volume of air as the hydrocarbon solvent released from the interior of the precursor particles easily enters the interior of the particles. Accordingly, hollow resin particles maintaining the hollow shape are obtained. The precursor particles including the hydrocarbon solvent have such a tendency that they are less likely to collapse than precursor particles including water.

The reason why the precursor particles including the hydrocarbon solvent are less likely to collapse than the precursor particles including water, is not clear yet. However, considering the free volume of the polymer constituting the shell, the following mechanism is estimated.

According to the model illustrating the structures of liquids proposed by H. Eyring et al., a liquid is composed of molecules and free volume (that is, a space where no molecules exist). According to the model, this free volume is composed of a collection of molecule-sized voids in a liquid, and at normal temperature and pressure, a free volume of about 3% occupies a liquid. This model is applicable to a solid structure including molecules having regularity such as a polymer.

In the present disclosure, the polarity of the polymer constituting the shell of the precursor particles is generally high. Accordingly, it is thought that water is easily compatible with polymer, and water molecules can be easily incorporated into the free volume of the polymer. In other words, the solubility coefficient of water molecules in the polymer is high. In contrast, due to its low polarity, the hydrocarbon solvent is not easily compatible with polymer. In other words, the solubility coefficient of the hydrocarbon solvent molecules in the polymer is low. As a result, the hydrocarbon solvent molecules cannot be easily incorporated into the free volume of the polymer.

In the particles including water, accordingly, since water molecules are incorporated into the polymer constituting the shell, the space where no molecules exist, is reduced. As a result, the gas permeability of the shell is decreased; the flow of air associated with the evaporation of water under dry conditions, is less likely to proceed; and the particles are likely to collapse. In contrast, in the particles including the hydrocarbon solvent, since the hydrocarbon solvent molecules are less likely to be incorporated into the free volume of a polymer, the gas permeability of the shell is kept relatively high. As a result, in the solvent removal step, the replacement of the hydrocarbon solvent with air quickly proceeds. Accordingly, the hollow resin particles maintaining the hollow portion are formed.

The method of performing solid-liquid separation of the precursor composition is not particularly limited, as long as it is a method that separates the solid components containing the precursor particles and the liquid components containing the aqueous medium without removing the hydrocarbon solvent included in the precursor particles, and a known method may be used. Examples of the solid-liquid separation method include a centrifugation method, a filtration method, and still-standing separation. Among them, a centrifugation method or a filtration method may be employed, and from the viewpoint of simplicity of the operation, a centrifugation method may be employed.

Any step such as a preliminary drying step may be performed at a time after the solid-liquid separation step and before performing the solvent removal step described later. Examples of the preliminary drying step include a step comprising performing preliminary drying on the solid components obtained after the solid-liquid separation step, with a drying apparatus such as a dryer or a drying appliance such as a hand dryer.

(5) Solvent Removal Step

The present step is a step of removing the hydrocarbon solvent included in the precursor particles in a gaseous atmosphere to obtain the hollow resin particles of which the hollow portion is filled with gas.

In the present step, the term "in a gaseous atmosphere" means "in an environment where no liquid components exist in the outside of the precursor particles" and "in an environment where only a very small amount of liquid components at a level that does not influence the removal of the hydrocarbon solvent exist in the outside of the precursor particles" in a strict sense. The term "in a gaseous atmosphere" can be reworded as a state where the precursor particles do not exist in a slurry, or it can be reworded as a state where the precursor particles exist in a dry powder. That is, in the present step, it is important to remove the hydrocarbon solvent in an environment where the precursor particles come into direct contact with the outside gas.

The method of removing the hydrocarbon solvent in the precursor particles in a gaseous atmosphere, is not particularly limited, and a known method may be employed. Examples of the method include a reduced pressure drying method, a heat drying method, a flash drying method, and the combination of these methods.

Especially, in the case of using the heat drying method, the heating temperature needs to be set to more than or equal to the boiling point of the hydrocarbon solvent and less than or equal to the highest temperature at which the shell structure of the precursor particles does not collapse. Therefore, depending on the composition of the shell of the precursor particles and the type of the hydrocarbon solvent, the heating temperature may be from 50° C. to 200° C., may be from 70° C. to 180° C., or may be from 100° C. to 150° C., for example.

The hydrocarbon solvent in the interior of the precursor particles is replaced with the outside gas by drying operation in the gaseous atmosphere. As a result, the hollow resin particles of which the hollow portion is filled with gas are obtained.

The drying atmosphere is not particularly limited and may be appropriately selected depending on the intended application of the hollow resin particles. Possible examples of the drying atmosphere include air, oxygen, nitrogen and argon. Further, by filling the hollow portion of the hollow resin particles with gas once and then performing reduced pressure drying, hollow resin particles of which the hollow portion is evacuated are also temporarily obtained.

(6) Others

In addition to the steps (1) to (5) mentioned above, a hollow portion re-replacement step and a base addition step may be added, for example.

[Hollow Portion Re-Replacement Step]

The present step is a step of replacing the gas in the hollow portion of the hollow resin particles with another gas or liquid. By such replacement, the environment of the hollow portion of the hollow resin particles can be changed; molecules can be selectively confined in the hollow portion of the hollow resin particles; or the chemical structure of the hollow portion of the hollow resin particles can be modified in accordance with the intended application thereof.

[Base Addition Step]

The present step is a step of using a hydrophilic monomer as a part of the polymerizable monomer in the mixture liquid, and adding a base to the precursor composition obtained by the polymerization step, thereby controlling the pH of the precursor composition to 6.0 or more. In the case of using an appropriate amount of the hydrophilic monomer, after the precursor particles having the hollow structure are obtained by the polymerization step, the base is added, and thereby the shell of the precursor particles can be swollen; the removal of the hydrocarbon solvent can be facilitated; and the void ratio of the hollow resin particles can be increased.

2. Hollow Resin Particles

A. Number Average Particle Diameter of Hollow Resin Particles

The number average particle diameter of the hollow resin particles obtained by the production method of the present disclosure is preferably from 0.1 µm to 10 µm, more preferably from 0.5 µm to 8 µm, still more preferably from 1 µm to 6 µm, yet more preferably from 1.5 µm to 5 µm, and particularly preferably from 2 µm to 4 µm.

The number average particle diameter of the hollow resin particles can be obtained by, for example, measuring the particle size distribution with a laser diffraction particle size distribution measuring apparatus and calculating the number average thereof.

The variation coefficient of the number average particle diameter of the hollow resin particles can be obtained by measuring the number-based particle size distribution with the laser diffraction particle size distribution measuring apparatus and dividing the standard deviation thereof by the number average particle diameter.

In the production method of the present disclosure, since the hollow is formed without expanding the shell, such hollow resin particles that the variation coefficient of the number average particle diameter is relatively small (that is, the hollow resin particles having a narrow particle size distribution) can be obtained. As the particle size distribution of the hollow resin particles gets narrower, the thus-formed coating film containing the hollow resin particles can be made flatter.

B. Shape (Morphology) of Hollow Resin Particles

The shape of the hollow resin particles is not particularly limited, as long as the hollow portion is formed in the interior. Examples of the shape include a spherical shape, an ellipsoidal shape and an irregular shape. Among them, a spherical shape is preferable in terms of ease of production.

The interior of the particles may have one or two or more hollow portions, or it may be porous. The interior of the particles preferably has only one hollow portion in order to maintain good balance between the high void ratio of the hollow resin particles and the mechanical strength of the hollow resin particles.

The average circularity of the hollow resin particles may be from 0.950 to 0.995.

An example of the image of the shape of the hollow resin particles is a bag made of a thin film and inflated with gas. A cross-section of the bag is like the hollow resin particle 100 shown in the diagram (5) of FIG. 1 described later. In this example, one thin film is provided on the outside, and the interior is filled with gas.

The shape of the particles can be determined by SEM or TEM, for example. Further, the shape of the interior of the particles can be determined by SEM or TEM after cutting the particles into round slices by a known method.

C. Void Ratio of Hollow Resin Particles

In the production method of the present disclosure, the void ratio of the hollow resin particles can be 60% or more, more preferably 65% or more, still more preferably 70% or more, and particularly preferably 75% or more. From the viewpoint of maintaining the strength of the particles, the void ratio of the hollow resin particles is preferably 95% or less, more preferably 93% or less, and still more preferably 90% or less.

The void ratio (%) of the hollow resin particles is calculated by the following formula (I) from the apparent density $D_1$ and true density $D_0$ of the hollow resin particles.

Void ratio(%)=100−(Apparent density $D_1$/True density $D_0$)×100   Formula (I)

A method for measuring the apparent density $D_1$ of the hollow resin particles is as follows. First, approximately 30 cm$^3$ of the hollow resin particles are introduced into a measuring flask with a volume of 100 cm$^3$, and the mass of the introduced hollow resin particles is precisely weighed. Next, the measuring flask in which the hollow resin particles are introduced is precisely filled with isopropanol up to the marked line while care is taken so that air bubbles do not get in. The mass of the isopropanol added to the measuring flask is precisely weighed, and the apparent density $D_1$ (g/cm$^3$) of the hollow resin particles is calculated by the following formula (II).

Apparent density $D_1$=[Mass of the hollow resin particles]/(100−[Mass of the isopropanol]/[Specific gravity of the isopropanol at the measuring temperature])   Formula (II)

The apparent density $D_1$ is equivalent to the specific gravity of the whole hollow resin particle in the case where the hollow portion is regarded as a part of the hollow resin particle.

A method for measuring the true density $D_0$ of the hollow resin particles is as follows. The hollow resin particles are pulverized in advance; approximately 10 g of the pulverized hollow resin particles are introduced into a measuring flask with a volume of 100 cm$^3$; and the mass of the introduced pulverized particles is precisely weighed. After that, similarly to the measurement of the apparent density mentioned above, isopropanol is added to the measuring flask; the mass of the isopropanol is precisely weighed; and the true density $D_0$ (g/cm$^3$) of the hollow resin particles is calculated by the following formula (III).

True density $D_0$=[Mass of the pulverized hollow resin particles]/(100−[Mass of the isopropanol]/[Specific gravity of the isopropanol at the measuring temperature])   Formula (III)

The true density $D_0$ is equivalent to the specific gravity of the shell portion alone of the hollow resin particle. As is clear from the measurement method mentioned above, when calculating the true density $D_0$, the hollow portion is not regarded as a part of the hollow resin particle.

The void ratio of the hollow resin particle can be reworded as the ratio occupied by the hollow portion in the specific gravity of the hollow resin particle.

D. Pressure Resistance of Hollow Resin Particles

The hollow resin particles of the present disclosure have strong particle strength. Accordingly, even if strong external force is applied, the outer and inner shapes of the particles are less likely to collapse, and the hollow can be maintained.

The compressive strength of the hollow resin particles can be measured by the following method.

As the method for measuring the compressive strength of the hollow resin particles, for example, the following method may be used.

The 10% compressive strength of the particles is measured under the following test conditions, using a micro compression tester (such as MCTM-500 manufactured by Shimadzu Corporation, etc.)

(Test Conditions)
  Indenter type: FLAT50
  Object lens magnification: 50
  Loading rate: 0.8924 mN/sec For example, when the compressive strength of the hollow resin particles is 5.0 MPa or more, the hollow resin particles are evaluated to have high compressive strength, depending on the intended application of the hollow resin particles.

3. Applications of Hollow Resin Particles

Possible examples of the intended application of the hollow resin particles include an under-coating material of thermal paper. In general, an under-coating material is required to have heat insulating properties and shock-absorbing properties (cushioning properties). In addition, it is required to have heat resistance in line with thermal paper uses. The hollow resin particles of the present disclosure can meet these requirements by virtue of their high void ratio, collapse-resistant hollow shape, relatively small number average particle diameter and high heat resistance.

Further, the hollow resin particles are useful as, for example, a plastic pigment that is excellent in gloss, hiding power, etc. Further, the hollow resin particles obtained by enclosing a useful component such as a perfume, a medicine, an agricultural chemical and an ink component in the interior by a means such as immersion treatment or depressurized or pressurized immersion treatment can be used for various applications in accordance with the component contained in the interior.

EXAMPLES

Hereinbelow, the present invention is described more specifically using examples and comparative examples. However, the present invention is not limited to these examples. Incidentally, "part(s)" and "go" are on a mass basis unless otherwise specified.

The test methods performed in the examples and comparative examples are as follows.

1. Calculation of Solubility Parameter (SP Value)

The SP value ($\delta$) of the polymerizable monomer and that of the solvent were calculated by the following formula (1) using, as described above, the $\Delta F$ and $\Delta v$ values of various kinds of atomic groups mentioned in the above Table 1 reported by Okitsu (Toshinao Okitsu, "Setchaku", Kobunshi Kankokai, Vol. 40, No. 8 (1996), pp. 342-350). The SP value ($\delta$mix) of the mixed solvent and that of the copolymer were calculated by the following formula (2).

$$\delta = \Sigma \Delta F / \Sigma \Delta v \quad \text{Formula (1)}$$

$$\delta\text{mix} = \varphi_1 \delta_1 + \varphi_2 \delta_2 + \ldots + \varphi_n \delta_n \quad \text{Formula (2)}$$

[In the formulae, $\Delta F$ denotes $\Delta F$ in the following Table 1; $\Delta v$ denotes molar volume $\Delta v$ in the following Table 1; and $\varphi$ denotes volume fraction or mole fraction, and $\varphi_1 + \varphi_2 + \ldots \varphi_n = 1$.] In the formulae, $\Delta F$ and $\Delta v$ denote molar volume $\Delta v$ in the following Table 1, and $\varphi$ denotes the amount of substance.]

2. Number Average Particle Diameter of Hollow Resin Particles

As described above, the particle diameter of the hollow resin particles was measured with a laser diffraction particle size distribution measuring instrument (product name: LA-960, manufactured by: HORIBA, Ltd.) The number average thereof was calculated, and the value thus obtained was taken as the number average particle diameter of the particles.

3. Morphology of Particle Interior

A cross-section of the hollow resin particles was exposed by ion milling and observed with a transmission electron microscope.

4. Void Ratio of Hollow Resin Particles

In accordance with the above method, the apparent density $D_1$ and true density $D_0$ of the hollow resin particles were measured. The void ratio (%) was calculated by the following formula (I).

$$\text{Void ratio}(\%) = 100 - (\text{Apparent density } D_1 / \text{True density } D_0) \times 100 \quad \text{Formula (I)}$$

5. Pressure Resistance

In accordance with the above method, the compressive strength of the hollow resin particles was measured.

Example 1

(1) Mixture Liquid Preparation Step

First, the following materials were mixed to obtain a mixture. The mixture was used as an oil phase.

Methacrylic acid: 40 parts

Ethylene glycol dimethacrylate: 60 parts (The SP value of the mixture of these polymerizable monomers was 9.41.)

2,2'-Azobis(2,4-dimethylvaleronitrile) (an oil-soluble polymerization initiator manufactured by Wako Pure Chemical Industries, Ltd., product name: V-65): 3.0 parts Cyclohexane: 310 parts (The SP value was 8.00)

Next, 800 parts of ion-exchanged water was mixed with 4.0 parts of a surfactant. The obtained mixture was used as an aqueous phase. Then, the aqueous phase and the oil phase were mixed to prepare a mixture liquid.

(2) Suspension Preparation Step

The mixture liquid obtained in the mixture liquid preparation step was stirred with an in-line type emulsifying disperser (product name: MILDER, manufactured by: Pacific Machinery & Engineering Co., Ltd.) for 5 minutes at a rotational frequency of 15,000 rpm to be suspended, and thereby a suspension in which monomer droplets including cyclohexane were dispersed in water was prepared.

(3) Polymerization Step

The suspension obtained in the suspension preparation step was stirred in a nitrogen atmosphere at 65° C. for 4 hours, and thereby polymerization reaction was performed. By this polymerization reaction, a precursor composition containing a hollow resin particle precursor including cyclohexane was prepared.

(4) Solid-Liquid Separation Step

The precursor composition obtained in the polymerization step was subjected to centrifugation with a cooling high-speed centrifuge (product name: H-9R, manufactured by: Kokusan Co., Ltd.) using a rotor MN1 at a rotational frequency of 3,000 rpm for a centrifugation time of 20 minutes, and thereby the solid components were dehydrated. The dehydrated solid components were dried with a dryer at a temperature of 40° C., and thereby a hollow resin particle precursor including cyclohexane was obtained.

(5) Solvent Removal Step

The hollow resin particle precursor obtained in the solid-liquid separation step was subjected to heating treatment with a vacuum dryer at 80° C. for 15 hours in a gaseous atmosphere, and thereby hollow resin particles were obtained. The number average particle diameter, void ratio and compressive strength of the obtained hollow resin particles were measured by the methods described above. The results are shown in Table 1. From the scanning electron microscopy result and void ratio value of the obtained hollow resin particles, the particles were confirmed to be in a spherical shape and to have only one hollow portion. The percentage of the monomer units constituting the resin portion was almost the same as that of the charged amount.

Examples 2 to 6 and Comparative Examples 1 to 4

The hollow resin particles of Examples 2 to 6 and Comparative Examples 1 to 4 were produced in the same manner as Example 1, except that the type and amount of the polymerizable monomers (the non-crosslinkable monomer and the crosslinkable monomer), the polymerization initiator and the hydrocarbon solvent were changed as shown in Table 2.

Comparative Example 5

Monomer components for polymerization (56 parts of methyl methacrylate and 24 parts of isobutyl methacrylate as non-crosslinkable monomers, and 20 parts of trimethylolpropane triacrylate as a crosslinkable monomer), 100 parts of cyclohexane as an organic solvent, and 0.5 parts of azobisisobutyronitrile (AIBN) as a polymerization initiator were mixed and stirred, thereby preparing a monomer solution for polymerization. Next, ion-exchanged water (50% by weight of the total amount used) as a polar solvent and a water-soluble polymer aqueous solution (PVA: a partially-saponified polyvinyl acetate aqueous solution) as a dispersant (a surfactant) were added thereto. The mixture was stirred by a homogenizer, thereby preparing a suspension. In a 20 L polymerization reactor equipped with a stirrer, a jacket, a reflux condenser and a thermometer, the rest of the ion-exchanged water and sodium sulfite as a water-soluble polymerization inhibitor were added, and the stirring of the mixture was started. The pressure inside the polymerization reactor was reduced to deoxidize the inside of the container. Then, the pressure was returned to the atmospheric pressure by nitrogen to place the inside under a nitrogen atmosphere. Then, the suspension was put into the polymerization container at once. Then, the temperature of the polymerization container was increased to 60° C. to initiate polymerization. The polymerization was completed for 4 hours. Following an aging time of one hour, the temperature of the polymerization container was cooled to room temperature. A slurry thus obtained was dehydrated by a centrifuge. Then, the organic solvent was removed therefrom by vacuum drying, thereby obtaining hollow polymer particles.

Comparative Example 6

First, 10 parts of a commercially-available polystyrene resin (manufactured by Nippon Steel. Chemical Co., Ltd., number average molecular weight 150,000) as a dissimilar polymer was dissolved in a mixture of 300 parts of toluene, 90 parts of methyl methacrylate, 10 parts of divinylbenzene and 3 parts of benzoylperoxide. The solution was added to an aqueous solution obtained by dissolving polyvinyl alcohol as a dispersant (a surfactant) in 800 parts of water. The mixed solution was polymerized at 80° C. for 4 hours with stirring, and thereby a dispersion of polymer particles having a particle diameter of from 2 μm to 10 μm was obtained at a polymerization yield of 98%. As a result of observing this with an optical microscope, it was found that the polymer particles were capsule particles with double contour. Next, steam stripping was performed by blowing steam into the dispersion of the polymer particles. As a result, the toluene was removed from the interior of the polymer particles, and water-containing hollow polymer particles containing water in the interior, were obtained. Also, the water-containing hollow polymer particles, and the capsule particles not yet subjected to the steam stripping and containing the toluene in the interior, were placed on a glass slide and observed with the microscope, without placing a cover glass thereon. As a result, it was shown that the water or toluene in the interior of both the water-containing hollow polymer particles and the capsule particles was evaporated in one to two minutes, and they became hollow particles.

[Results]

Table 2 shows the type and amount of the materials used in the examples, and the SP values and test results of the examples.

TABLE 2

| | | Example 1 | Example 2 | Example 3 | Example 4 | Example 6 | Example 6 |
|---|---|---|---|---|---|---|---|
| (A) Polymerizable monomer (Non-crosslinkable monomer) | Methacrylic acid (Parts) | 40 | 40 | 10 | 20 | 45 | 16 |
| | Methyl methacrylate (Parts) | | | | | | 25 |
| | Butyl acrylate (Parts) | | | | 45 | 10 | |
| | Isobutyl methacrylate (Parts) | | | | | | 10 |
| (A) Polymerizable monomer (Crosslinkable monomer) | Ethylene glycol dimethecrylate (Parts) | 60 | 60 | 90 | 35 | 45 | |
| | Divinylbenzene (Parts) | | | | | | 60 |
| | Trimethylolpropane triacrylate (Parts) | | | | | | |
| Dissimilar polymer | Polystyrene resin | | | | | | |
| (B) Oil-soluble polymerization initiator (Parts) | | 3.0 | 3.0 | 3.0 | 3.0 | 3.0 | 3.0 |
| (C) Hydrocarbon solvent | Cyclohexane (Parts) | 310 | | 310 | 310 | | 310 |
| | n-Hexane (Parts) | | 600 | | | | |
| | n-Butyl acetate (Parts) | | | | | 310 | |
| | Toluene (Parts) | | | | | | |
| (D) Suspension stabilizer | Surfactant (Parts) | 4.0 | 4.0 | 4.0 | 4.0 | 4.0 | 4.0 |
| (E) Aqueouss medium | Ion-exchanged water (Parts) | 800 | 800 | 800 | 800 | 800 | 800 |
| SP value (SP1) of polymerizable monomer | | 9.41 | 9.41 | 9.42 | 9.08 | 9.33 | 8.75 |
| SP value (SP2) of hydrocarbon solvent | | 8.00 | 7.24 | 8.00 | 8.00 | 8.73 | 8.00 |
| SP value (SP1) of polymerizable | | 1.41 | 2.17 | 1.42 | 1.08 | 0.60 | 0.75 |

TABLE 2-continued

| | | | | | | | |
|---|---|---|---|---|---|---|---|
| monomer - SP value (SP2) of hydrocarbon solvent | | | | | | | |
| Polymerization stability (Aggregation during polymerization) | | ◯ | ◯ | ◯ | ◯ | ◯ | ◯ |
| Number average particle diameter (μm) | | 2.8 | 3.0 | 2.9 | 3.1 | 3.0 | 2.9 |
| Morphology of particle interior | | Single-hole | Single-hole | Single-hole | Single-hole | Single-hole | Single-hole |
| Void ratio (%) | | 80 | 90 | 82 | 77 | 80 | 70 |
| Compressive strength (MPa) | | 10.2 | 8.5 | 13.8 | 7.5 | 9.0 | 7.0 |

| | | Comparative Example 1 | Comparative Example 2 | Comparative Example 3 | Comparative Example 4 | Comparative Example 5 | Comparative Example 6 |
|---|---|---|---|---|---|---|---|
| (A) Polymerizable monomer (Non-crosslinkable monomer) | Methacrylic acid (Parts) | 40 | 15 | 8 | | | |
| | Methyl methacrylate (Parts) | | 25 | 13 | | 56 | 90 |
| | Butyl acrylate (Parts) | | 10 | 5 | | | |
| | Isobutyl methacrylate (Parts) | | | | | 24 | |
| (A) Polymerizable monomer (Crosslinkable monomer) | Ethylene glycol dimethecrylate (Parts) | 60 | | | 100 | | |
| | Divinylbenzene (Parts) | | 50 | 75 | | | 10 |
| | Trimethylolpropane triacrylate (Parts) | | | | | 20 | |
| Dissimilar polymer | Polystyrene resin | | | | | | 10 |
| (B) Oil-soluble polymerization initiator (Parts) | | 3.0 | 3.0 | 3.0 | 3.0 | 0.5 | 3.0 |
| (C) Hydrocarbon solvent | Cyclohexane (Parts) | | | 310 | 310 | 100 | |
| | n-Hexane (Parts) | | | | | | |
| | n-Butyl acetate (Parts) | | | | | | |
| | Toluene (Parts) | 310 | 310 | | | | 300 |
| (D) Suspension stabilizer | Surfactant (Parts) | 4.0 | 4.0 | 4.0 | 4.0 | 20.0 | 1.0 |
| (E) Aqueouss medium | Ion-exchanged water (Parts) | 800 | 800 | 800 | 800 | 800 | 800 |
| SP value (SP1) of polymerizable monomer | | 9.40 | 8.75 | 6.60 | 9.43 | 7.75 | 8.76 |
| SP value (SP2) of hydrocarbon solvent | | 9.02 | 9.02 | 8.00 | 8.00 | 8.00 | 9.02 |
| SP value (SP1) of polymerizable monomer - SP value (SP2) of hydrocarbon solvent | | 0.38 | −0.27 | 0.60 | 1.43 | −0.25 | −0.26 |
| Polymerization stability (Aggregation during polymerization) | | ◯ | ◯ | X | X | ◯ | ◯ |
| Number average particle diameter (μm) | | 4.0 | 5.0 | — | — | 40 | 6.0 |
| Morphology of particle interior | | Porous | Porous | — | — | Porous | Single-hole |
| Void ratio (%) | | 30 | 20 | — | — | 50 | 75 |
| Compressive strength (MPa) | | 15.5 | 10.1 | — | — | 8.0 | 2.1 |

[Consideration]

Hereinafter, the evaluation results of the examples will be examined with reference to Table 2.

In Comparative Example 1, with respect to the total amount (100 parts) of the non-crosslinkable monomer and the crosslinkable monomer, the content of the crosslinkable monomer was 60 parts, and the amount of the crosslinkable monomer was sufficient. Accordingly, the compressive strength of the hollow resin particles was 15.5 MPa, and the particle strength was large. However, since the difference between the SP value of the polymerizable monomer and the SP value of the hydrocarbon solvent was 0.38 and small, the void ratio was 30% and low, and the hollow property was at a poor level. According to the morphology of the interior of the particles, a porous structure was observed, and a single-hole structure was not formed.

In Comparative Example 2, with respect to the total amount (100 parts) of the non-crosslinkable monomer and the crosslinkable monomer, the content of the crosslinkable monomer was 50 parts, and the amount of the crosslinkable monomer was sufficient. Accordingly, the compressive strength of the hollow resin particles was 10.1, and the particle strength was large. However, since the difference between the SP value of the polymerizable monomer and the SP value of the hydrocarbon solvent is −0.27 and small, the void ratio was 20% and low, and the hollow property was at a poor level. According to the morphology of the interior of the particles, a porous structure was observed, and a single-hole structure was not formed.

In Comparative Example 3, the SP value of the polymerizable monomer was 8.60 and too low. Accordingly, the polymerization stability deteriorated, and the resin particles aggregated during the polymerization. Since the physical properties that enable the use as the hollow resin particles were not obtained, the void ratio, compressive strength and morphology observation were not performed.

In Comparative Example 4, the SP value of the polymerizable monomer was 9.43 and too high. Accordingly, the polymerization stability deteriorated, and the resin particles aggregated during the polymerization. Since the physical properties that enable the use as the hollow resin particles were not obtained, the void ratio, compressive strength and morphology observation were not performed.

In Comparative Example 5, the difference between the SP value of the polymerizable monomer and the SP value of the hydrocarbon solvent was −0.25 and small, the void ratio was 50% and low, and the hollow property was at a poor level. According to the morphology of the interior of the particles, a porous structure was observed, and a single-hole structure was not formed. The number average particle diameter was 40 μm, and the particle size was too large.

In Comparative Example 6, the difference between the SP value of the polymerizable monomer and the SP value of the hydrocarbon solvent was −0.26 and small. However, in Comparative Example 6, since the method did not utilize the difference between the SP value of the polymerizable monomer and the SP value of the hydrocarbon solvent, hollow resin particles having a single-hole structure and a high void ratio (75%) were obtained. However, the compressive strength of the hollow resin particles was 2.1 MPa and small. In Comparative Example 6, accordingly, hollow resin particles having a high void ratio and a large particle strength were not obtained.

In Examples 1 to 6, hollow resin particles having a single-hole structure were obtained, which had a number average particle diameter of from 2.8 μm to 3.1 μm, a high void ratio (70% to 90%) and a sufficient compressive strength (7.0 MPa to 13.8 MPa). Especially, the hollow resin particles of Example 3 had the largest compressive strength among Examples 1 to 6, since the content of the crosslinkable monomer was large (90 parts with respect to 100 parts of the polymerizable monomer). The hollow resin particles of Example 2 had the largest void ratio among Examples 1 to 6, since the difference between the SP value of the polymerizable monomer and the SP value of the hydrocarbon solvent was 2.17 and large.

REFERENCE SIGNS LIST

1. Aqueous medium
2. Lipophilic material
3. Suspension stabilizer
4. Monomer composition
4a. Monomer dispersed in aqueous medium
5. Oil-soluble polymerization initiator
6. Shell
7. Hydrocarbon solvent
8. Hollow portion
10. Micelle
20. Precursor particle
51. Aqueous medium
52. Surfactant
53. Monomer composition
53a. Monomer dissolved out in aqueous medium
54. Water-soluble polymerization initiator
60. Micelle
60a. Micelle precursor
100. Hollow resin particle

The invention claimed is:

1. A method for producing hollow resin particles, the method comprising:
   carrying out a suspension treatment of a mixture liquid comprising a polymerizable monomer comprising at least one non-crosslinkable monomer and at least one crosslinkable monomer, a hydrocarbon solvent and an aqueous medium to prepare a suspension in which monomer droplets containing the hydrocarbon solvent are dispersed in the aqueous medium,
   carrying out a polymerization reaction of the suspension to form precursor particles having a hollow portion and including the hydrocarbon solvent in the hollow portion, and
   removing the hydrocarbon solvent included in the precursor particles to produce hollow resin particles,
   wherein a content of the crosslinkable monomer in the mixture liquid is from 35 parts by mass to 95 parts by mass when the total mass of the polymerizable monomer is regarded as 100 parts by mass;
   wherein a solubility parameter (SP value) of the polymerizable monomer is from 9.33 to 9.42;
   wherein a difference between the solubility parameter (SP value) of the polymerizable monomer and a solubility parameter (SP value) of the hydrocarbon solvent is 0.60 or more; and
   wherein the hollow resin particles each has only one hollow portion.

2. The method for producing the hollow resin particles according to claim 1, wherein a void ratio of the hollow resin particles is from 60% to 95%.

3. The method for producing the hollow resin particles according to claim 2, wherein a void ratio of the hollow resin particles is from 80% to 95%.

4. The method for producing the hollow resin particles according to claim 1, wherein a number average particle diameter of the hollow resin particles is from 0.1 μm to 10 μm.

5. The method for producing the hollow resin particles according to claim 1, wherein the non-crosslinkable monomer contains an acid group-containing monomer.

6. The method for producing the hollow resin particles according to claim 1, wherein the non-crosslinkable monomer contains (meth)acrylic acid and (meth)acrylate at a mass ratio of (meth)acrylic acid:(meth)acrylate=100:0 to 30:70.

7. The method for producing the hollow resin particles according to claim 1, wherein the crosslinkable monomer contains ethylene glycol di(meth)acrylate.

* * * * *